Patented Aug. 17, 1943

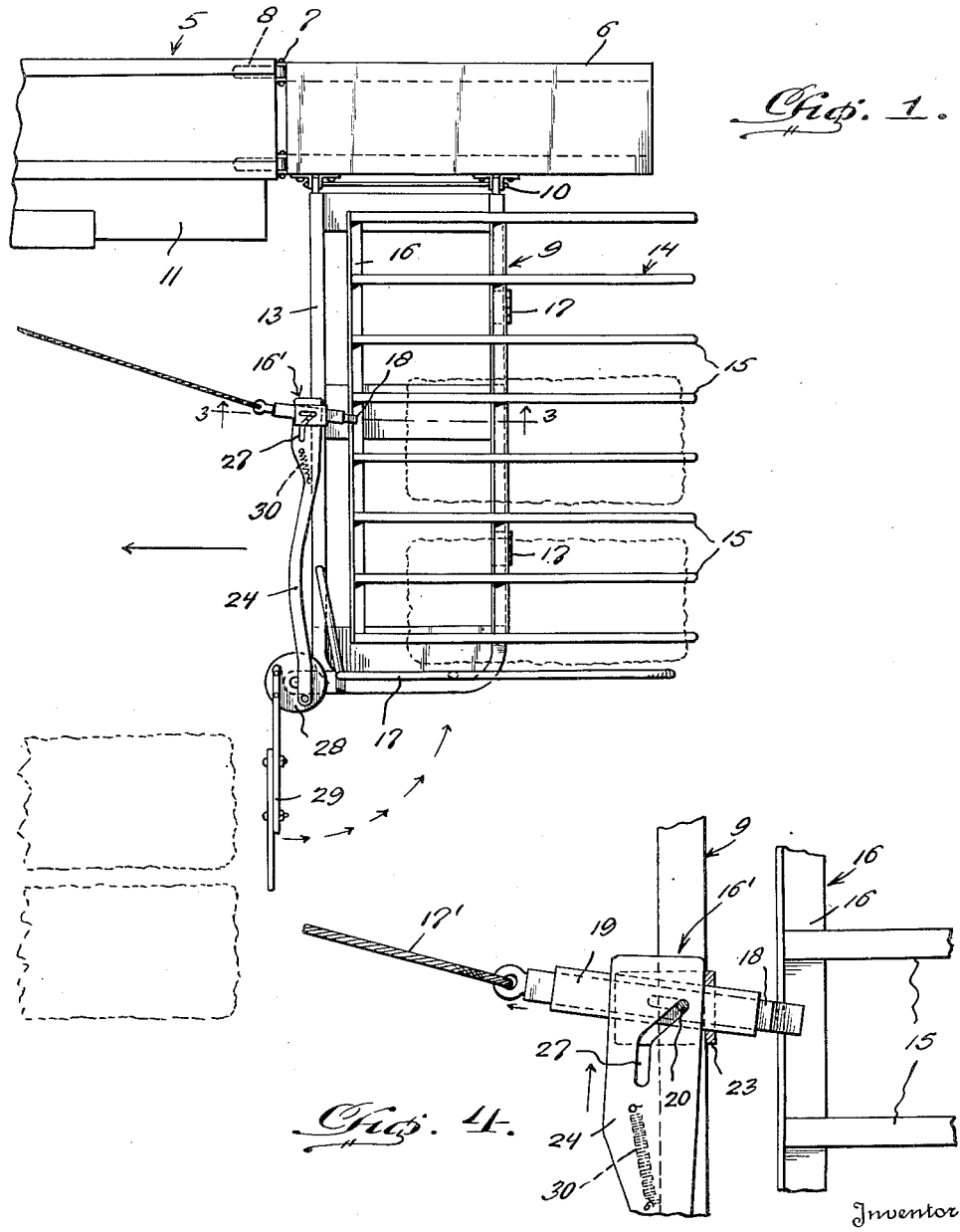

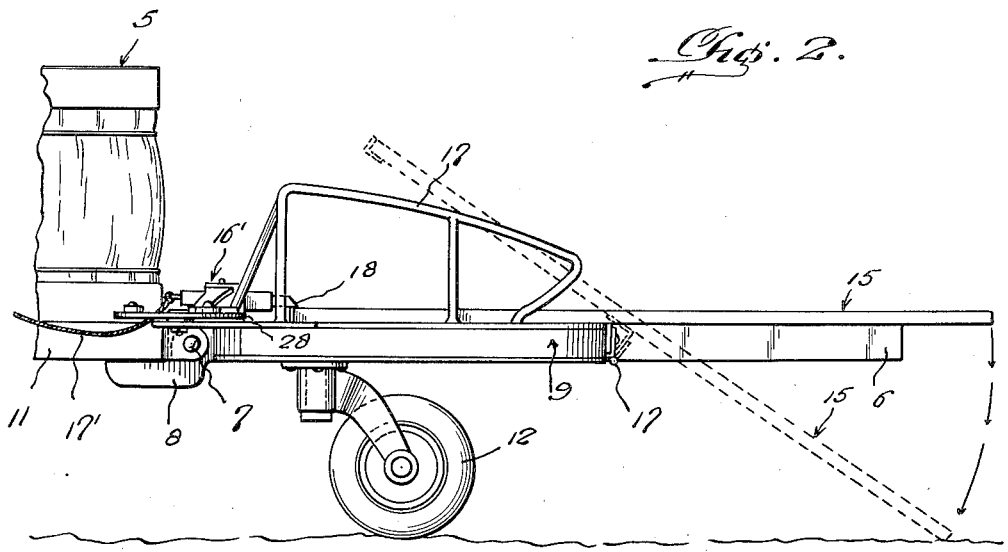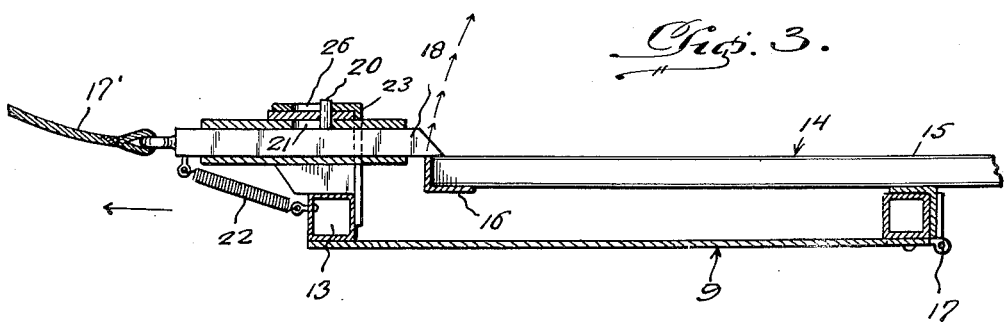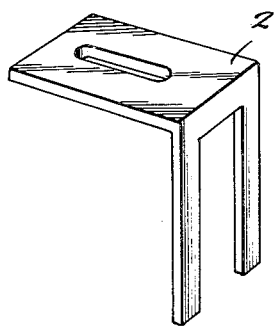

2,327,264

UNITED STATES PATENT OFFICE 2,327,264

BALE CARRIER FOR HAY BALERS

Clifford W. Hendrickson, Kildare, Okla.

Application November 11, 1942, Serial No. 465,277

4 Claims. (Cl. 214—65)

This invention relates to a bale carrier for a hay baler of the pickup or traveling type, and has for the primary object the provision of a device of the above stated character which may be readily adapted to a hay baler of the kind specified for dumping in windrows bales of hay made by the baler, so that the collection or gathering of the bales in the field may be easily accomplished and in less time than when the bales of hay are left by the baler in a scattered manner within the field or dropped whenever a bale is completed by the baler.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a bale carrier constructed in accordance with my invention and showing the same applied to a fragmentary portion of a baler.

Figure 2 is an end elevation illustrating the carrier and showing in dotted lines the dumping thereof and in which direction the carrier may be swung to assume an inoperative position and carried by the baler for transportation from one place to another while inoperative.

Figure 3 is a transverse sectional view showing a latch mechanism for releasably securing the dumping cable of the carrier in operative or carrying position, and taken on the line 3—3 of Figure 1.

Figure 4 is a fragmentary top plan view, partly in section, showing said latch mechanism.

Figure 5 is a perspective view illustrating a bracket employed in the construction of the latch mechanism.

Referring in detail to the drawings, the numeral 5 indicates a fragmentary portion of a hay baler of the type adapted to travel in a field for the purpose of gathering mowed hay or the like and for forming the gathered hay into bales. A hay baler of the kind specified has a tail board 6 arranged at the discharge end of the baler for the purpose of receiving the bales after being formed by the baler and prior to moving onto the ground.

It is to be understood that the bales of hay are fed from the baler onto the tail board and remain thereon only as long as it takes for the baler to form another bale, the latter discharging the preceding bale from the tail board as it leaves the baler. This way of dumping the bales of hay onto the field is not satisfactory, owing to the fact that the hay bales are scattered rendering it difficult to gather the bales and also requiring a considerable amount of time. Therefore, the purpose of the present invention is to make provision for receiving the bales from the baler or the tail board thereof and carrying a number of such bales until such time it is desired to form a windrow whence the bales on the present invention may be dumped through the manual operation of the present invention.

After the windrows have been established and on the next trip of the baler about the field, the present invention will automatically dump the collected bales when a windrow is encountered. It is to be understood that the bales when received on the tail board are manually shoved onto the carrier and remain thereon until the carrier is dumped.

The bail board 6 is secured to the baler by hinges 7 so that when the tail board is not in use it may be swung vertically. To prevent the tail board 6 from moving below a horizontal position when in use projections 8 are provided on the hinged end of the tail board to engage with the baler. This construction is common in hay balers of the kind specified.

The bale carrier constituting the present invention is indicated in entirety by the character 9, and by referring to Figure 1 it will be seen that the carrier is hinged on one side of the tail board 6, the hinge being indicated by the character 10 which will permit the carrier to either assume a horizontal operative position or to be swung vertically in relation to the tail board. When in a vertical position with relation to the tail board and the latter swung into a vertical position, the carrier will be brought alongside of the baler 5 and supported on a shelf 11 forming a part of the baler. This arranges the carrier for transportation by the baler from one place to another permitting the baler to easily pass through ordinary driveways within fences or the like.

When the carrier is brought into an operative position or horizontally it is supported in said position through its connection with the tail board and a ground wheel 12 of the pilot type. The swivel connection in the construction of the pilot type ground wheel may include anti-friction bearings.

The carrier includes an elongated main frame 13 on which is hinged a dumping rack 14 consisting of a plurality of spaced tines 15 connected to an auxiliary frame 16 which is mounted on the main frame 13 by hinges 17. To sustain the rack 14 in horizontal position or in a position of carrying bales thereon, as shown in Figure 1, a latch mechanism 16 is provided. The latch mechanism is mounted on the main frame 13 and the slidable plunger 18 thereof engages with the rack 14 to releasably secure the same in a position of carrying the bales. A manually operated cable 17' leading to an operator on the baler is connected with the plunger, whereby the operator may release the rack to assume dumping position, as shown in dotted lines in Figure 2. The weight of the bales on the rack will cause the latter to assume the dumping position when the latch is operated. The rack may be returned manually to a carrying position or the weight of the auxiliary frame will be sufficient to bring the rack into carrying position after the bales have passed therefrom.

One end of the plunger 18 is beveled to permit the rack to readily pass said plunger on moving into bale-carrying position so that the latch bolt or plunger will overlie the auxiliary frame and releasably secure the rack against dumping.

The carrier further includes at one end thereof a skeleton frame structure 18' for limiting the movement of the bales onto the rack from the tail board.

The plunger 18 is slidably supported by a housing 19 suitably mounted on the main frame 13. The plunger has a pin 20 secured thereto which operates through a slot 21 provided in said housing. The latch bolt or plunger is normally urged into latching position by a coil spring 22 secured to said plunger and to the main frame 13.

A substantially L-shaped plate 23 straddles the plunger and is spaced from the top wall of said housing to form a guide for an operating link 24. The guide plate 23 has a slot 26 to receive the pin 20 after the same extends through a cam shaped slot 27 provided in the link 24. The link 24 is eccentrically pivoted to a disc rotatably mounted on the main frame 13 at the wheel supported end thereof. A trip arm adjustable as to length is indicated at 29 and is eccentrically secured on the disc 28. The purpose of the trip arm is to engage with bales of hay that have been deposited on the field for the purpose of bringing about rotation of the disc 28 by the forward movement of the baler. The rotation of the disc 28 imparts sliding movement to the link 24 and due to the cam shaped slot 27 the latch bolt or plunger will be moved into a retracted position allowing the rack 14 of the carrier to pivot into dumping position for depositing the bales of hay thereon adjacent to the already deposited bales in the field, consequently bringing about the locating of the bales of hay within windrows.

The movement of the trip arm by the bales of hay in the field is indicated by the arrows in Figure 1 and to return the trip arm to its initial position after disengagement from the last referred to bales of hay, a spring of the coil type, indicated by the character 30, is secured to the link 24 and to the main frame 13.

From the foregoing description, taken in connection with the accompanying drawings, it will be seen that a simple and durable construction of carrier has been provided which may be readily installed on a hay baler for the purpose of receiving manually from the baler bales of hay and is capable of being dumped either manually or automatically by bales of hay already lying in the field, consequently permitting the bales of hay to be arranged within the field in windrows to facilitate the collection of the bales of hay from the field.

Further, it will be seen that the carrier is of such a construction that it may be readily folded onto the baler when the tail board has been swung into a vertical position, so that the hay baler may be driven from one place to another without being interfered with by the carrier.

While I have shown and described the preferred embodiment of my invention, it will be understood that minor changes in construction, combination and arrangement of parts may be made without departing from the spirit and scope of the invention as claimed.

Having thus described my invention, what I claim is:

1. In combination with a traveling type baler, including a foldable tail board to receive a bale after being formed by the baler, a carrier frame hinged on the tail board and extending laterally therefrom, a ground wheel for the support of said frame, a dumping rack carried by said frame to have bales placed thereon from the tail board, and a latch means for sustaining the rack in carrying position.

2. In combination with a traveling type baler including a foldable tail board to receive a bale after being formed by the baler, a carrier frame hinged on the tail board and extending laterally therefrom, a ground wheel for the support of said frame, a dumping rack carried by said frame to have bales placed thereon from the tail board, a latch means for sustaining the rack in carrying position, and a trip operated by previously deposited bales to operate the latch means for freeing the rack into dumping position and thereby bring about depositing of the bales thereon adjacent to the previously dumped bales.

3. In combination with a traveling type baler including a foldable tail board, a carrier frame hinged on the tail board, a pilot type wheel supporting said frame, a carrier rack hinged on said frame to have bales manually placed thereon from the tail board, a latch mechanism carried by the frame and engaging the rack to sustain the latter in carrying position, and a trip mechanism operated by previously deposited bales for actuating the latch to free the carrier to assume dumping position for depositing the bales on said carrier adjacent to the previously deposited bales.

4. In combination with a traveling type baler having a foldable tail board, a carrier frame hinged on said tail board, a ground wheel supporting said frame, a dump rack hinged on said frame and adapted to have bales from the tail board placed manually thereon, a latch mechanism carried by the frame and engaging the rack to releasably sustain the latter in carrying position, a disc journaled on the frame, a link eccentrically connected to said disc and connected to the latch mechanism, and a trip arm eccentrically secured to said disc and adjustable as to length to engage with previously deposited bales for the operation of the latch to free the rack for dumping the bales thereon adjacent to the previously deposited bales.

CLIFFORD W. HENDRICKSON.